(12) United States Patent
Nagamiya et al.

(10) Patent No.: US 6,267,792 B1
(45) Date of Patent: Jul. 31, 2001

(54) CONTROL APPARATUS AND CONTROL METHOD FOR REFORMER

(75) Inventors: Kiyomi Nagamiya, Toyota; Masashi Yamashita, Aichi-ken; Masaaki Yamaoka, Toyota; Yoshikazu Motozono, Aichi-ken, all of (JP)

(73) Assignee: Toyota Jidosha Kabushiki Kaisha, Toyoto (JP)

( * ) Notice: Subject to any disclaimer, the term of this patent is extended or adjusted under 35 U.S.C. 154(b) by 0 days.

(21) Appl. No.: 09/353,593

(22) Filed: Jul. 15, 1999

(30) Foreign Application Priority Data

Aug. 3, 1998 (JP) .................................................. 10-219470

(51) Int. Cl.[7] ................................. B01J 8/04; C01P 3/38; C10K 3/06; H01M 8/06
(52) U.S. Cl. ........................... 48/197 R; 73/199; 422/105; 422/107; 422/108; 422/110; 422/112; 422/116; 429/17; 429/19; 429/22; 429/25
(58) Field of Search ...................................... 422/105, 107, 422/108, 110, 112, 116; 73/199; 429/19, 17, 13, 22, 25; 48/197 R, 198.7, 199 R

(56) References Cited

U.S. PATENT DOCUMENTS

| | | | |
|---|---|---|---|
| 4,125,091 | * 11/1978 | Hori et al. | 123/3 |
| 4,822,521 | 4/1989 | Fuderer | 252/376 |
| 4,984,456 | * 1/1991 | Takahashi | 73/118.2 |
| 5,366,821 | * 11/1994 | Merritt et al. | 429/21 |

FOREIGN PATENT DOCUMENTS

| | | |
|---|---|---|
| 0 743 694 A1 | 11/1996 | (EP) . |
| 0 798 798 A2 | * 10/1997 | (EP) . |
| 0 834 948 A2 | 4/1998 | (EP) . |
| 7-57756 | 3/1995 | (JP) . |

* cited by examiner

Primary Examiner—Hien Tran
Assistant Examiner—Basia Ridley
(74) Attorney, Agent, or Firm—Oliff & Berridge, PLC

(57) ABSTRACT

A control apparatus can maintain a substantially constant temperature of a reforming reaction in which a partial oxidation reaction occurs. The control apparatus can be used for a reformer that reforms reformats fuel into fuel by an endothermic reforming reaction and a partial oxidation reforming reaction. The amount of oxygen supplied for the partial oxidation reaction is determined based on an amount of the raw material and on theoretical endothermic values and exothermic values of the respective reforming reaction and partial oxidation reaction.

12 Claims, 4 Drawing Sheets

CONTROL APPARATUS AND CONTROL METHOD FOR REFORMER

BACKGROUND OF THE INVENTION

1. Field of Invention

The present invention relates to an apparatus and a method for controlling a reaction which occurs in a reformer for reforming hydrocarbon and reformate fuel into a desired type of fuel with a high concentration of hydrogen.

2. Description of Related Art

A reformer designed to reform a vapor mixture of methanol and water into reformate gas mainly composed of hydrogen is known. In principle, according to a reforming reaction occurring in the reformer, methanol reacts with water vapor so as to produce hydrogen gas. In other words, a water vapor reforming reaction occurs in the reformer. This is an endothermic reaction, as can be understood from equation (1) shown below.

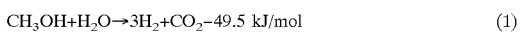

$$CH_3OH + H_2O \rightarrow 3H_2 + CO_2 - 49.5 \text{ kJ/mol} \quad (1)$$

Further, the activation temperature of a reforming catalyst is relatively high (about 300° C.). Therefore, in order to continue the above-mentioned reforming reaction, it is necessary to supply a corresponding amount of reaction heat.

On the other hand, as an example of a reforming reaction of methanol, there is a partial oxidation reforming reaction wherein hydrogen is produced through an oxidation reaction. This is an exothermic reaction, as can be understood from the equation (2) shown below.

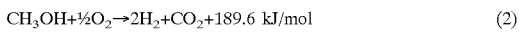

$$CH_3OH + \tfrac{1}{2}O_2 \rightarrow 2H_2 + CO_2 + 189.6 \text{ kJ/mol} \quad (2)$$

The reactions represented by the aforementioned formulas (1) and (2) can be caused to proceed simultaneously. For example, there is known a fuel cell system of a type compatible with partial oxidation, wherein the heat generated in the partial oxidation reaction compensates for the heat absorbed in the water vapor reforming reaction (Japanese Patent Publication No. HEI 7-57756).

As is apparent from the equations (1) and (2), the amount of heat absorbed in the water vapor reforming reaction is greatly different from the amount of heat generated in the partial oxidation reaction. Thus, provided that these reactions occur simultaneously for methanol of 1 mol, a large amount of heat is generated and the catalyst reaches an excessively high temperature, so that the catalyst may deteriorate in activity or durability. Conversely, if the partial oxidation reforming reaction (equation (2)) is at a low ebb, the reforming catalyst falls in temperature, so that an undesirably large amount of methanol remains and an undesirably large amount of carbon monoxide gas is produced.

That is, even in the case where the water vapor reforming reaction is caused to proceed simultaneously with the partial oxidation reforming reaction, the proceeding of the water vapor reforming reaction may be adversely affected depending on a degree of the proceeding of the partial oxidation reforming reaction. For this reason, the reformer of a type compatible with partial oxidation needs to suitably control the partial oxidation reaction. However, the above-described known apparatus do not control the partial oxidation reaction. Therefore, the known apparatus have trouble in constantly maintaining the reforming portion at a temperature required for the reforming reaction. In particular, in the case where the amount of reformate fuel fluctuates in response to load fluctuations in an energy converter such as a fuel cell which consumes reformate fuel, the temperature of the reforming portion such as the reforming catalyst may become unstable. As a result, the reformate gas may deteriorate in quality.

SUMMARY OF THE INVENTION

The present invention has been made in consideration of the aforementioned disadvantages of known apparatus and methods. It is an object of the present invention to provide an apparatus and a method capable of constantly maintaining a reformer, that utilizes both a reforming reaction and a partial oxidation reforming reaction, at a temperature required for the reforming reaction.

In order to achieve the above-stated object, the present invention has focused attention on the fact that the oxygen supplied to the reforming portion undergoes the partial oxidation reaction. The amount of oxygen to be supplied can be determined based on either a required amount of reformate fuel contributing to the exothermic reforming reaction (the water vapor reforming reaction), or a required amount of reformate fuel contributing to the partial oxidation reaction. In the present invention, the amount of oxygen to be supplied is determined based on an amount of reformate fuel contributing to the partial oxidation reaction, which amount is determined based on a ratio between a theoretical endothermic value in the endothermic reforming reaction and a theoretical exothermic value in the partial oxidation reaction.

That is, according to one aspect of the present invention, a control apparatus for a reformer includes a controller for controlling the introduction of raw material and oxygen into the reformer and promoting an endothermic reforming reaction and an exothermic partial oxidation reaction, and for determining an amount of oxygen supplied for the partial oxidation reaction based on an amount of the raw material and on theoretical exothermic values in the reforming reaction and the partial oxidation reaction.

In the above aspect, the endothermic value and the exothermic value are balanced with each other in the reforming reaction, so that the portion of the reformer where the reforming reaction occurs can be maintained at a predetermined temperature. Consequently, the reforming reaction proceeds favorably, and high-quality fuel can be obtained.

In addition to the features of the above aspect, the controller determines an amount of time from supply of the raw material to occurrence of the reforming reaction and the partial oxidation reaction, and adjusts the determined amount of supply of oxygen based on that amount of time.

Thus, even if there is a fluctuation in the amount of supply of the raw material, the amount of supply of oxygen is corrected in accordance with a temporal delay of a fluctuation in the reforming reaction resulting from the fluctuation in amount of supply of the raw material. Therefore, the portion of the reformer where the reforming reaction occurs can be maintained at the predetermined temperature with higher precision.

Further, in addition to the features of the above aspect, the control apparatus can include a temperature detector for detecting a temperature of a portion of the reformer where the reforming reaction and the partial oxidation reaction occur, and the controller can adjust the determined amount of supply of oxygen based on the detected temperature. In this manner, the portion of the reformer where the reforming reaction occurs can be maintained at the predetermined temperature with still higher precision. As a result, the reforming reaction is stabilized and high-quality fuel can be obtained.

Further, in addition to the features of the above aspect, the controller can estimate a state quantity of oxygen supplied for the partial oxidation reaction, and adjust the determined amount of supply of oxygen based on the estimated state quantity of oxygen.

According to the above embodiment, the state quantity such as a feed pressure of oxygen is estimated in supplying oxygen, and the amount of supply of oxygen is corrected based on the estimated state quantity. Thus, the amount of supply of oxygen can be controlled precisely. As a result, the reforming reaction is stabilized and high-quality fuel can be obtained.

BRIEF DESCRIPTION OF THE DRAWINGS

The foregoing and further objects, features and advantages of the present invention will become apparent from the following description of a preferred embodiment with reference to the accompanying drawings, wherein.

DETAILED DESCRIPTION OF PREFERRED EMBODIMENTS

An exemplary embodiment of the present invention will now be described with reference to the accompanying drawings.

Figure 2:
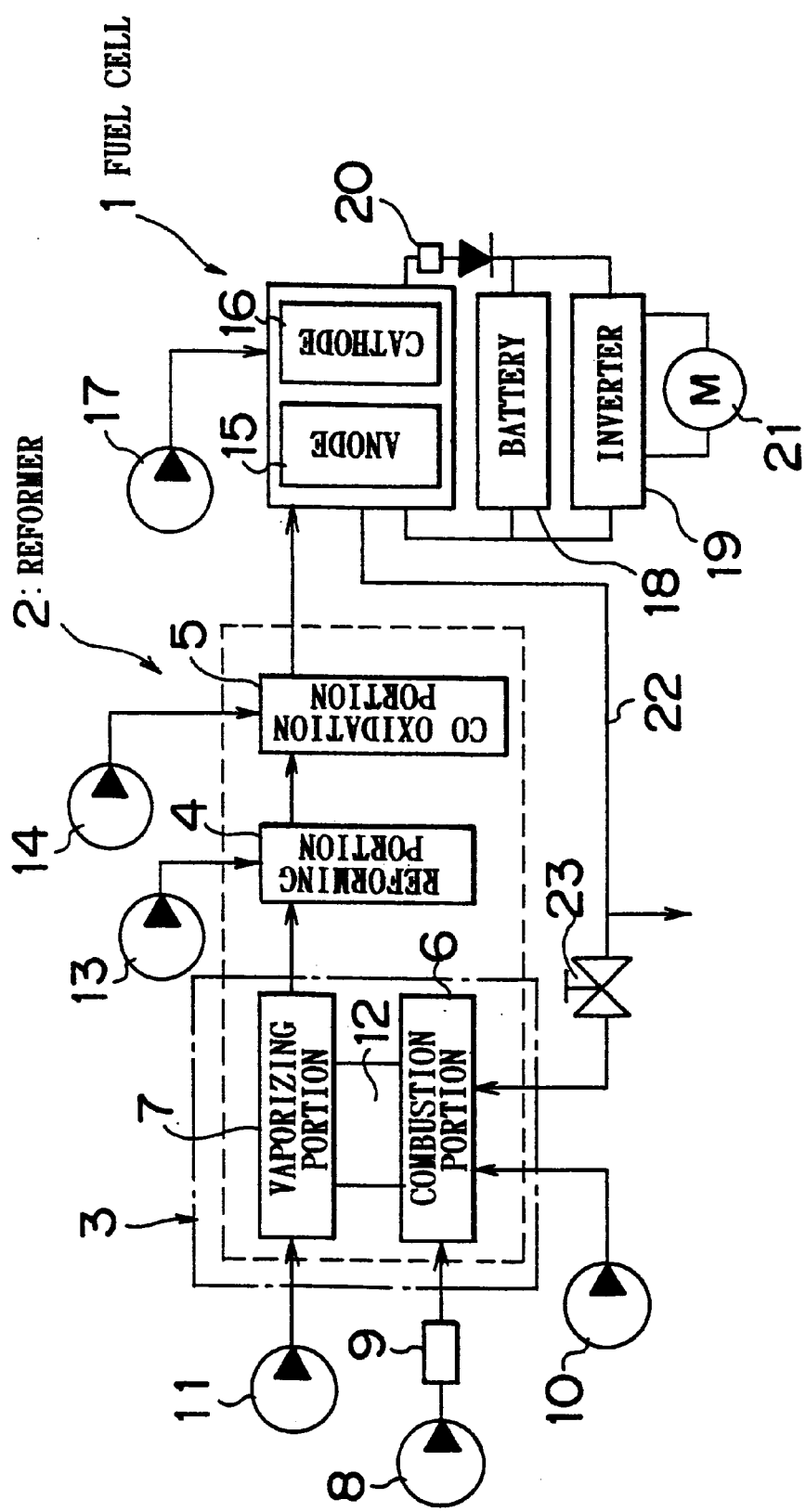
FIG. 2 is a schematic view showing a system that includes a reformer connected to a fuel cell.

FIG. 2 schematically illustrates a system wherein a reformer that uses reformate fuel is employed, and wherein reformate gas generated in the reformer is utilized to convert energy in an energy converter. A reformer 2 reforms reformate fuel, which is the mixture of methanol and water, into reformate gas substantially comprising hydrogen and carbon dioxide. The reformer 2 is connected to an anode 15 side of a fuel cell 1, which is used as an energy converter. The reformer 2 comprises a heating portion 3 for heating the reformate fuel, a reforming portion 4 and a carbon monoxide (CO) oxidation portion 5.

The heating portion 3 generates vapor of the mixture of methanol and water by heating reformate fuel. The heating portion 3 comprises a combustion portion 6 for generating heat for heating reformate fuel, and a vaporizing portion 7 for vaporizing the reformate fuel using the heat generated by the combustion portion 6. The combustion portion 6 may comprise a burner that causes heat fuel to burn or a catalyst that oxidizes heat fuel. Referring to FIG. 2, a pump 8 for feeding heat fuel, such as methanol, is connected to the combustion portion 6 via an injector 9. Further, there is provided an air feed portion 10 for feeding a combustion support gas, such as air. More specifically, the air feed portion 10 comprises an air pump.

Further, a pump 11 serving as a reformate fuel feed portion for feeding the liquid mixture of methanol and water is connected to the vaporizing portion 7. The vaporizing portion 7 is coupled to the combustion portion 6 such that heat can be transmitted therebetween through a heat exchanger 12.

Figure 3A:
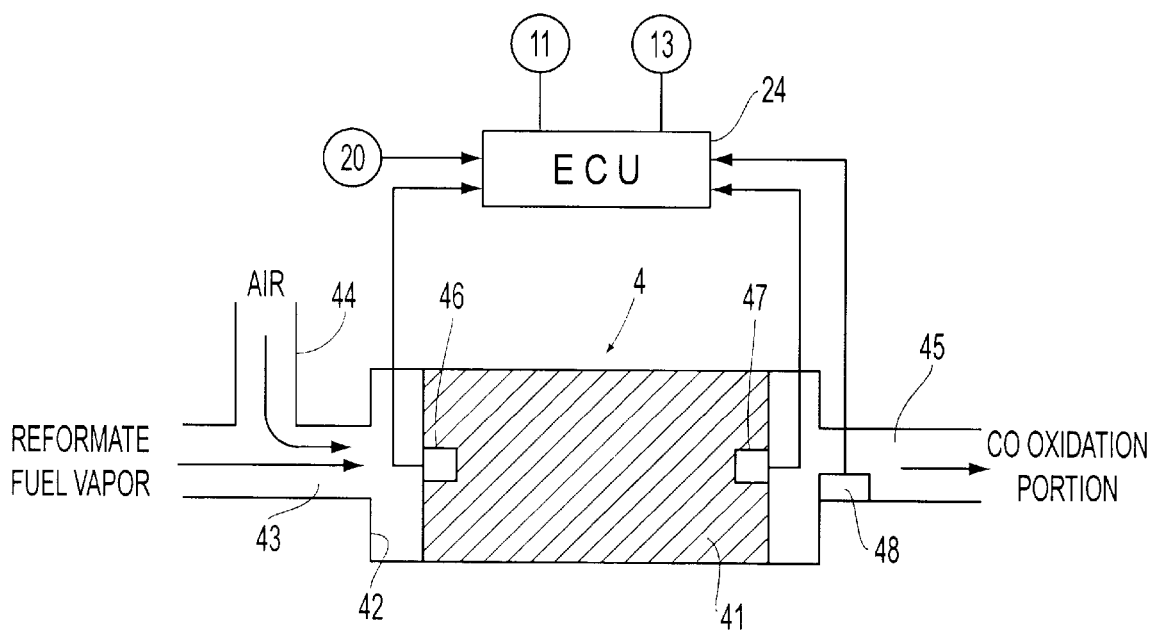
FIG. 3A is a schematic view showing a reforming portion of the reformer.

The reforming portion 4 generates gas substantially comprising hydrogen, mainly by reforming reactions of methanol. The reforming reactions are a water vapor reforming reaction indicated by the above equation (1) and a partial oxidation reaction is indicated by the equation (2). In order to cause these reactions, as can be seen from FIG. 3A, a catalytic layer 41 composed of a catalyst such as a copper-based catalyst with an activation temperature, for example, of from about 280–300° C., is provided inside a chamber 42. The vaporizing portion 7 is connected to a feed port 43 of the chamber 42. A partial oxidation air feed pipe 44 for feeding oxygen for the partial oxidation reaction is connected to the feed port 43. An air pump 13 is connected to the partial oxidation air feed pipe 44 of the reforming portion 4.

Further, temperature sensors 46 and 47, which detect a temperature of the catalytic layer 41 and provide output signals, are disposed on the side of the feed port 43 of the chamber 42, and on the side of a discharge port 45 of the chamber 42, respectively. Still further, a pressure sensor 48 is disposed on the side of the discharge port 45.

The reforming reaction represented by the equation (1) and the partial oxidation reaction represented by the equation (2) occur only in ideal circumstances. Further, carbon dioxide is reversibly changed into carbon monoxide. Therefore, in fact, the inclusion of carbon monoxide into the reformate gas is inevitable. Because carbon monoxide would poison a catalyst at a fuel electrode of the fuel cell 1, the CO oxidation portion 5 is provided so as to reduce the carbon monoxide. The CO oxidation portion 5 is provided with a CO oxidation catalyst and an air feed portion 14. The reformate gas generated in the reforming portion 4 is passed through the CO oxidation portion 5 so that the carbon monoxide contained in the reformate gas is oxidized by oxygen contained in air.

The fuel cell 1 typically comprises a multitude of unit cells that are interconnected to one another. For example, each unit cell can have a construction wherein a high-molecular electrolyte film permeable to protons is interposed between the anode 15 and a cathode 16. Each of the anode 15 and cathode 16 is composed of a diffusion layer and a reaction layer. The reaction layer at the anode 15 has a porous structure wherein a catalyst such as platinum, platinum alloy or ruthenium is carried, for example, on a support such as carbon. The anode 15 communicates with the reformer 2, to which reformate gas mainly containing hydrogen gas is fed. An air feed portion 17 such as a pump is connected to the cathode 16 so as to feed oxygen, which is to react with hydrogen contained in the reformate gas.

External loads such as a battery 18 and an inverter 19 are connected to the respective anode 15 and cathode 16 so as to form a closed circuit. The closed circuit incorporates a current sensor 20. Furthermore, a motor 21 is connected to the inverter 19. For example, the motor 21 serves as a power source for driving a vehicle.

The ionization of hydrogen generated in the anode 15 and the oxidation reaction through an electrolytic film do not occur as to all of the hydrogen supplied to the fuel cell 1. The reaction efficiency is several tens of percent, and the exhaust gas discharged from the side of the anode 15 contains unreacted combustible gas that is irrelevant to the reaction, namely, hydrogen gas. In order to take advantage of this fact effectively, a return pipe 22 for returning exhaust gas on the side of the anode 15 to the combustion portion 6 is disposed such that the fuel cell 1 communicates with the combustion portion 6. Further, the return pipe 22 extends across a flow rate regulating valve 23 for controlling the flow rate of gas flowing within the return pipe 22. The opening degree of the flow rate regulating valve 23 is electrically controlled. Furthermore, the return pipe 22 suitably discharges the gas flowing therein to the outside instead of supplying the gas to the combustion portion 6.

A controller 24, such as an electronic control unit (ECU) is provided so as to control the supply of reformate fuel to the vaporizing portion 7, as well as the supply of partial oxidation air. The controller 24 is a microcomputer, which includes a central processing unit (CPU), storage devices (RAM, ROM) and an I/O interface. An output signal from the current sensor 20, detection signals from the temperature sensors 46 and 47, and a detection signal from the pressure sensor 48 are input to the controller 24 as control data. A determination is then made based on the input data and preliminarily stored data, and control signals are output to the pump 11 and the air pump 13, so as to control the amounts of supply of the reformate fuel and partial oxidation air.

The basic operation of the reformer 2 will now be described. A liquid feed pump 11 feeds the liquid mixture of methanol as reformate fuel and water to the vaporizing portion 7. Combustion methanol is introduced from the injector 9 into the combustion portion 6. Alternatively, exhaust gas containing unreacted hydrogen gas is supplied from the return pipe 22 to the combustion portion 6 simultaneously with the spraying of combustion methanol, or instead of combustion methanol. Further, the air pump 10 feeds air as combustion support gas to the combustion portion 6. The combustion methanol and/or the air and heat fuel composed of unreacted hydrogen gas undergo an oxidation reaction (that is, burn) in the oxidation catalyst and generate heat. This heat vaporizes the liquid mixture, so that the vapor mixture of methanol and water is generated.

The vapor mixture generated in the vaporizing portion 7 is delivered to the reforming portion 4. The copper-based catalyst provided in the reforming portion 4 causes a reforming reaction of methanol with water. Consequently, reformate gas substantially comprising hydrogen gas and carbon dioxide gas is generated. Simultaneously, there is caused a partial oxidation reaction of the air fed from the air pump 13 to the reforming portion 4 with methanol. The partial oxidation reaction is represented by the above equation (2). As a result of the partial oxidation reaction, hydrogen gas and carbon dioxide gas are generated.

The reforming reaction of methanol is an endothermic reaction, whereas the partial oxidation reaction of methanol is an exothermic reaction. Hence, these reactions are controlled such that the endothermic value becomes equal to the exothermic value. Thereby, the heat budget in the reforming portion 4 is balanced so that the temperature of the reforming portion 4 is kept substantially constant. Because heat substantially neither enters nor leaves the reforming portion 4, the heat generated in the combustion portion 6 is exclusively used to heat and vaporize the reformate fuel.

In principle, the gas generated in the reforming portion 4 is only hydrogen gas and carbon dioxide gas. In fact, however, a small amount of carbon monoxide (about 1%) is typically also generated. While reformats gas passes through the CO oxidation portion 5, most of the carbon monoxide reacts with oxygen contained in the air fed from the air feed portion 14 and then becomes carbon dioxide. The reformate gas with a high concentration of hydrogen is delivered to the anode 15 of the fuel cell 1, whereby hydrogen ions and electrons are generated in the reaction layer thereof. The hydrogen ions permeate the electrolytic film, react with oxygen on the side of the cathode 16 and generate water. The electrons generate motive power through the external loads.

Figure 1:
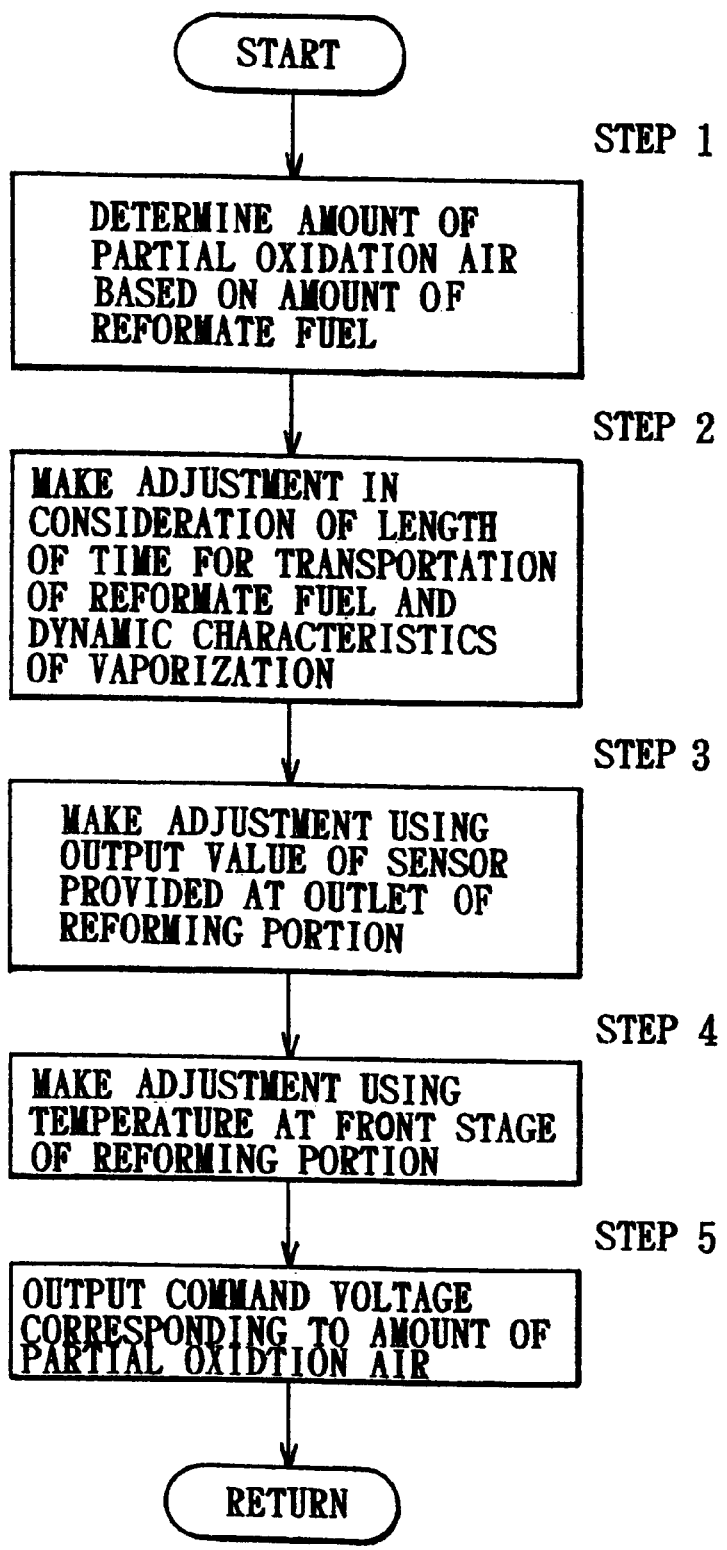
FIG. 1 is a flowchart illustrating an exemplary embodiment of a control operation performed in a control apparatus of the present invention.

In order to maintain the reforming portion 4 at a substantially constant temperature during the above-described reforming process, the amount of oxygen for the partial oxidation reaction, that is, the amount of air supply is controlled as follows. FIG. 1 is a flowchart illustrating an exemplary embodiment of such control. First, the amount of partial oxidation air is determined based on an amount of reformate fuel (STEP 1). The amount of reformate fuel Fk (mol/s) corresponds to an amount of hydrogen required in the fuel cell 1. Therefore, the amount of reformate fuel is determined based on a load applied to the fuel cell 1.

Further, in the case where methanol is reformed through water vapor reformation and partial oxidation reformation, the endothermic and exothermic values are represented by the above equations (1) and (2). Hence, about 21% of the methanol fed to the reforming portion 4 is subjected to partial oxidation reformation, and the remaining 79% of the methanol is subjected to water vapor reformation, whereby the heat budget in the reforming reactions is balanced. Furthermore, as is apparent from the equation (2), ½ mole of oxygen is required to oxidize and reform 1 mole of methanol. Accordingly, the amount of partial oxidation air Fpo (1/s) required for the determined amount of reformate fuel Fk (mol/s) is calculated using equation (3) shown below.

$$Fpo\ (1/s) = 0.105 \times Fk(mol/s) \times 22.4\ (1/mol) \times 100/21 \times 298/273 \quad (3)$$

In this formula, "100/21" represents a conversion factor in converting the required amount of oxygen into the amount of air, and "298/273" represents a volume correction factor for a room temperature of 25° C.

In changing an amount of reformate fuel, by the time the corresponding change in the reforming reaction occurs, adjustment is made in consideration of a length of time for transporting reformate fuel and a dynamic characteristic in the vaporizing portion 7 (STEP 2). First, adjustment is made as to a delay resulting from the transportation of the reformate fuel. Provided that the length of delay time is t0, the adjustment is made according to the following formula: Fpo1=Fpo (t−t0). That is, the amount of air that is determined before the lapse of the delay time t0 is adopted as a current amount of partial oxidation air. Further, if it is assumed that the dynamic characteristic of the vaporizing portion 7 is a primary delay, adjustment is made according to the equation (4) shown below.

$$Fpo2 = Fpo2(\text{old}) \times \tau/(DT+\tau) + Fpo1 \times DT/(DT+\tau) \quad (4)$$

In this equation,
DT represents a control cycle,
τ is an amount indicative of a degree of primary delay, and
Fpo2(old) represents a hysteresis of the value of Fpo2 during a preceding control cycle.

Then, the amount of partial oxidation air is corrected based on the temperature detected by the temperature sensor 47 on the side of the discharge port 45 of the reforming portion 4, using the equation (5) shown below (STEP 3).

$$Fpo3 = Fpo2(\text{old}) + Kp \times (Trot-Tro) + Ki \times \Sigma(Trot-Tro) \quad (5)$$

In this equation,
Kp and Ki are control parameters,

Trot is a target temperature on the side of the discharge port of the reforming portion 4, and Tro is the temperature detected by the temperature sensor 47.

That is, if the detected temperature on the side of the discharge port is high, the amount of partial oxidation air is reduced. Conversely, if the detected temperature on the side of the discharge port is low, the amount of partial oxidation air is controlled such that the detected temperature becomes a target temperature.

Furthermore, the amount of partial oxidation air is adjusted based on a temperature on the side of the inlet port of the reforming portion 4 (STEP 4). This step is intended to at least substantially prevent deterioration of the reforming catalyst, which especially results from a temperature exceeding a predetermined temperature. For example, the value determined in STEP 3 is corrected using the equation (6) shown below.

$$Fpo4 = Kdec \times Fpo3 \qquad (6)$$

Figure 3B:
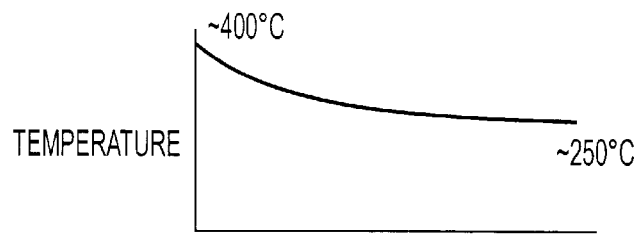
FIG. 3B shows the temperature profile across the catalytic layer of FIG. 3A.
Figure 4:
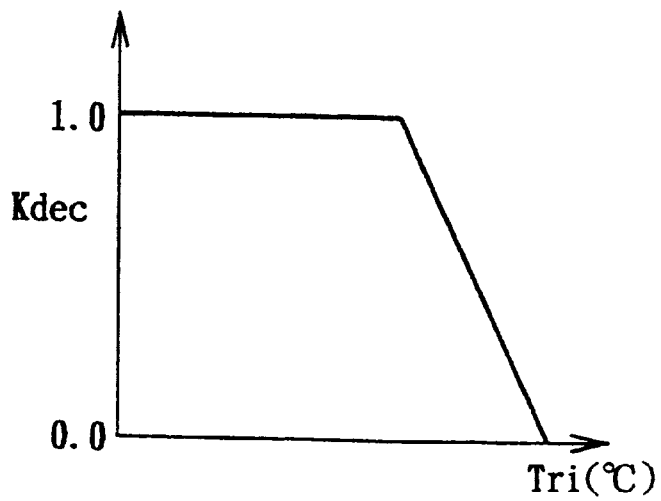
FIG. 4 is a map for determining a coefficient for adjusting an amount of supply of partial oxidation air based on a temperature.

In this equation, Kdec represents a function of a temperature Tri (° C.) that is detected by the temperature sensor 46 on the side of the inlet port 43 of the reforming portion 4. For example, the value of Kdec is determined based on a relationship shown in FIG. 4. The inflection point of the graph shown in FIG. 4 represents a threshold value of catalyst deterioration resulting from an abnormally high temperature. Accordingly, if the temperature of the reformate fuel vapor supplied to the catalytic layer 41 is high, the partial oxidation reforming reaction is restricted, so that the temperature of the catalyst is reduced down to the target temperature. FIG. 3B shows an example of temperature distribution in the catalytic layer 41 of the reforming portion 4.

Figure 5:
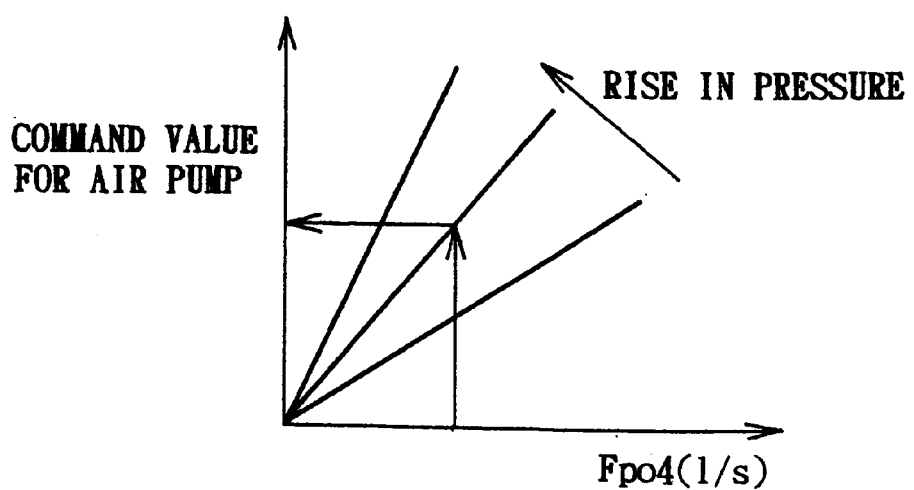
FIG. 5 is a map showing a relationship between the amount of supply of partial oxidation air and the command value for an air pump, using a pressure as a parameter.

Then, a command signal is output to the air pump 13 so as to supply the reforming portion 4 with partial oxidation air of the thus-corrected amount Fpo4 (STEP 5). In this case, if the pressure on the side of the inlet port of the reforming portion 4 is high, the output of the air pump 13 needs to be increased. Therefore, the command value to be output to the air pump 13 is set as follows. First of all, the pressure sensor 48 provided on the side of the discharge port 45 of the reforming portion 4 detects a pressure. Based on the detected pressure, the pressure of partial oxidation air on the side of the feed port 43 of the reforming portion 4 (the amount indicative of a state of oxygen supply) is estimated. Then, based on a map such as shown in FIG. 5, the air pump command value for the amount of partial oxidation air is set using the estimated pressure as a state quantity. For example, even in the case where the pressure on the side of the feed port 43 is high due to a great amount of reformate fuel vapor supplied to the reforming portion 4 from the vaporizing portion 7, the output of the air pump 13 increases correspondingly. Thus, it is possible to supply a precise amount of oxygen required for the partial oxidation reformate reaction.

As described above, according to the control apparatus of the present invention, the amount of supply of oxygen contributing to the partial oxidation reforming reaction is set based on an amount of reformate fuel, a theoretical endothermic value of the water vapor reforming reaction, and a theoretical exothermic value of the partial oxidation reforming reaction. Therefore, the endothermic value is balanced with the exothermic value in the reforming portion 4, which can be maintained substantially at its target temperature.

In particular, this embodiment adjusts an amount of air based on a delay in transportation or reaction of reformate fuel, and based on temperatures on the feed and discharge sides of the reforming portion 4. Therefore, the amount of oxygen for the partial oxidation reforming reaction, that is, the degree of the partial oxidation reformate reaction, can be set to a target value. As a result, the reforming portion 4 is set to a temperature for maintaining the catalyst in its activated state, which makes it possible not only to enhance reforming efficiency but also to obtain high-quality reformate gas. Furthermore, according to the above-described embodiment, the command value for the air pump 13 is set based on an estimated value of a pressure at the location where partial oxidation air is supplied, namely, on the side of the feed port 43. Therefore, the determined or adjusted amount of air, that is, oxygen, can be supplied to the reforming portion 4. Consequently, the proportion of the partial oxidation reaction can be set with high precision, and the reforming portion 4 can be substantially maintained at its target temperature.

In the above-described embodiment, the present invention is applied to a control apparatus designed for a reformer for supplying the fuel cell 1 with fuel gas. However, the present invention can also be applied to other apparatus for supplying reformate gas.

Furthermore, although methanol is used as reformate fuel in the abovedescribed embodiment, it is also possible to alternatively use hydrocarbons other than methanol. In addition, although the pressure on the feed side of the reforming portion is adopted as an amount indicative of a state of supply of partial oxidation air in the above-described embodiment, it is also possible to use other state quantities in other embodiments.

Furthermore, in the above-described embodiment, the amount indicative of a state of supply of partial oxidation air is estimated based on a pressure on the discharge side of the reforming portion. However, it is also possible to directly detect a pressure on the discharge portion of the reforming portion for partial oxidation air. Also, the amount indicative of a state of partial oxidation air can also be estimated based on a pressure at the outlet of the reformer.

In the above-described embodiments, the controller 24 is implemented as a programmed general purpose computer. It will be appreciated by those skilled in the art that the controller 24 can be implemented using a single special purpose integrated circuit (e.g., ASIC) having a main or central processor section for overall, system-level control, and separate sections dedicated to performing various different specific computations, functions and other processes under control of the central processor section. The controller 24 also can be a plurality of separate dedicated or programmable integrated or other electronic circuits or devices (e.g. hardwired electronic or logic circuits such as discrete element circuits, or programmable logic devices such as PLDs, PLAs, PALs or the like). The controller 24 can be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the programs shown in FIG. 1 can be used as the controller. A distributed processing architecture can be used for maximum data/signal processing capability and speed.

While the present invention has been described with reference to what is presently considered to be a preferred embodiment thereof, it is to be understood that the present invention is not limited to the disclosed embodiment or construction. On the contrary, the present invention is intended to cover various modifications and equivalent arrangements. In addition, while the various elements of the disclosed invention are shown in various combinations and configurations, which are exemplary, other combinations and configurations, including more, less or only a single embodiment, are also within the spirit and scope of the present invention.

What is claimed is:

1. A control apparatus for a reformer, comprising:
   a controller that:
   controls introduction of raw material and oxygen into the reformer so as to promote an endothermic reforming reaction and an exothermic partial oxidation reaction in the reformer;
   determines an amount of oxygen supplied for the partial oxidation reaction based on an amount of the raw material and on theoretical endothermic and exothermic values for the reforming reaction and the partial oxidation reaction, respectively;
   determines a length of time from the introduction of the raw material to occurrence of the reforming reaction and the partial oxidation reaction; and
   adjusts the determined amount of oxygen supplied based on the determined length of time.

2. The control apparatus according to claim 1, further comprising:
   a temperature detector that detects a temperature of a portion of the reformer where the reforming reaction and the partial oxidation reaction occur; and
   wherein the controller adjusts the determined amount of oxygen supplied based on the detected temperature.

3. The control apparatus according to claim 1, wherein the controller:
   estimates a state quantity of oxygen supplied for the partial oxidation reaction; and
   adjusts the determined amount of oxygen supplied based on the estimated state quantity of oxygen.

4. The control apparatus according to claim 3, wherein the estimated state quantity of oxygen is a pressure of the oxygen that is supplied.

5. A reformer comprising a control apparatus according to claim 1.

6. A reformer system, comprising:
   a reformer that converts reformate fuel into a reformate gas comprising hydrogen;
   a control apparatus according to claim 1 for controlling the reformer; and
   an energy converter that converts the reformate gas into another form of energy.

7. The reformer system of claim 6, wherein the energy converter is a fuel cell.

8. A method of controlling a reformer, comprising:
   introducing raw material and oxygen into the reformer and promoting an endothermic reforming reaction and an exothermic partial oxidation reaction in the reformer;
   determining an amount of oxygen supplied for the partial oxidation reaction based on an amount of the raw material and on theoretical endothermic and exothermic values in the reforming reaction and the partial oxidation reaction, respectively;
   determining a length of time from the introduction of the raw material into the reformer to the occurrence of the reforming reaction and the partial oxidation reaction; and
   adjusting the determined amount of oxygen supplied based on the determined length of time.

9. The method according to claim 8, further comprising:
   detecting a temperature of a portion of the reformer where the reforming reaction and the partial oxidation reaction occur; and
   adjusting the determined amount of oxygen supplied based on the detected temperature.

10. The method according to claim 8, further comprising:
    estimating a state quantity of oxygen supplied for the partial oxidation reaction; and
    adjusting the determined amount of oxygen supplied based on the estimated state quantity of oxygen.

11. The method according to claim 10, wherein the estimated state quantity of oxygen is a pressure of the oxygen that is supplied.

12. A control apparatus for a reformer, comprising:
    means for introducing raw material and oxygen into a reformer and promoting an endothermic reforming reaction and an exothermic partial oxidation reaction in the reformer; and
    means for determining an amount of oxygen supplied for the partial oxidation reaction based on an amount of the raw material and on theoretical endothermic and exothermic values in the reforming reaction and the partial oxidation reaction, respectively;
    means for determining a length of time from the introduction of the raw material into the reformer to the occurrence of the reforming reaction and the partial oxidation reaction; and
    means for adjusting the determined amount of oxygen supplied based on the determined length of time.

* * * * *